US006809303B2

(12) United States Patent
Carver et al.

(10) Patent No.: US 6,809,303 B2
(45) Date of Patent: Oct. 26, 2004

(54) PLATEN HEATERS FOR BIOMETRIC IMAGE CAPTURING DEVICES

(75) Inventors: John F. Carver, Hobe Sound, FL (US); George W. McClurg, Jensen Beach, FL (US); Joe F. Arnold, Palm Beach Gardens, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 0 days.

(21) Appl. No.: 10/047,983

(22) Filed: Jan. 17, 2002

(65) Prior Publication Data

US 2003/0089702 A1 May 15, 2003

Related U.S. Application Data

(60) Provisional application No. 60/331,247, filed on Nov. 13, 2001.

(51) Int. Cl.[7] ............................ G06K 9/00; H05B 3/24

(52) U.S. Cl. ...................... 219/543; 219/522; 219/201; 382/127; 359/512; 359/831

(58) Field of Search ................................ 219/543, 522, 219/200, 201; 359/831, 833, 834, 837, 512; 382/127, 124

(56) References Cited

U.S. PATENT DOCUMENTS

| | | | | |
|---|---|---|---|---|
| 3,475,588 A | * 10/1969 | McMaster | 219/543 |
| 3,495,259 A | * 2/1970 | Rocholl et al. | 219/543 |
| 3,540,025 A | * 11/1970 | Levin et al. | 359/831 |
| 4,336,998 A | 6/1982 | Ruell | 356/71 |
| 4,358,677 A | 11/1982 | Ruell et al. | 250/216 |
| 4,701,772 A | * 10/1987 | Anderson et al. | 347/136 |
| 5,230,025 A | 7/1993 | Fishbine et al. | |
| 5,351,127 A | * 9/1994 | King et al. | 356/445 |
| 5,467,403 A | 11/1995 | Fishbine et al. | |
| 5,825,474 A | * 10/1998 | Maase | 356/71 |
| 5,946,135 A | * 8/1999 | Auerswald et al. | 359/529 |
| 6,000,224 A | 12/1999 | Foye | 62/3.2 |
| 2003/0012417 A1 | 1/2003 | Hamid | |
| 2003/0016427 A1 | 1/2003 | Arnold et al. | |
| 2003/0089703 A1 | * 5/2003 | Carver et al. | 219/543 |

FOREIGN PATENT DOCUMENTS

| | | |
|---|---|---|
| EP | 785750 | * 6/1999 |
| JP | 62-212892 | * 9/1987 |
| JP | 63-137206 | 6/1988 |
| JP | 1-205392 | * 8/1989 |
| JP | 3-161884 | * 7/1991 |
| JP | 3-194674 | * 8/1991 |
| JP | 3-194675 | * 8/1991 |
| SU | 1769854 | * 10/1992 |

OTHER PUBLICATIONS

Roethenbaugh, G., *Biometrics Explained*, International Computer Security Association, ICSA, Inc., 1998, pp. 1–34.

* cited by examiner

*Primary Examiner*—John A. Jeffery
(74) *Attorney, Agent, or Firm*—Sterne, Kessler, Goldstein & Fox P.L.L.C.

(57) ABSTRACT

Devices and methods for applying heat to a platen of a biometric image capturing device are described that remove and prevent the formation of excess moisture on the platen. These devices and methods prevent undesirable interruptions of total internal reflection of a prism that result in biometric images having a halo effect. In embodiments of the invention, an electrically conductive transparent material is used to apply heat to the platen. In other embodiments, resistive heating elements attached to non-optical areas of the platen (e.g., the ends) are used to apply heat to the platen. Heater assemblies according to the invention can be used to heat an area where a biometric object is placed, or an area adjacent to where the biometric object is placed, to remove and prevent the formation of excess moisture on the platen.

8 Claims, 5 Drawing Sheets

FIG. 8

| STATE | HEATER ASSEMBLY T | THERMOSTAT CONTROLLER SWITCHES | | POWER STATE OF R1, R2 |
|---|---|---|---|---|
| | | SW1 | SW2 | |
| INITIAL | < 115.5°F | OFF | OFF | FULL POWER |
| FIRST THRESHOLD | ≥ 115.5°F | ON | OFF | HALF POWER |
| SECOND THRESHOLD | ≥ 121°F | ON | ON | ZERO POWER |

PLATEN HEATERS FOR BIOMETRIC IMAGE CAPTURING DEVICES

CROSS-REFERENCE TO RELATED APPLICATIONS

This application claims the benefit of U.S. Provisional Application Ser. No. 60/331,247, filed Nov. 13, 2001, which is incorporated herein by reference in its entirety.

FIELD OF THE INVENTION

The present invention is directed to the field of security control and, in particular, to electronic biometric image capturing devices.

BACKGROUND OF THE INVENTION

Biometrics is the science of biological characteristic analysis. Biometric imaging captures a measurable characteristic of a human being for identification of the particular individual (for example, a fingerprint). See, for example, Gary Roethenbaugh, *Biometrics Explained,* International Computer Security Association, Inc., pp. 1–34 (1998), which is incorporated by reference herein in its entirety.

Traditionally, techniques for obtaining a biometric image have included application of ink to a person's fingertips, for instance, and rolling or simply pressing the tips of the individual's fingers to appropriate places on a recording card. This technique can be very messy due to the application of ink, and may often result in a set of prints that are difficult to read.

Today, biometric image capturing technology includes electro-optical devices for obtaining biometric data from a biometric object, such as, a finger, a palm, etc. In such instances, the electro-optical device may be a fingerprint scanner, a palm scanner, or another type of biometric scanner. The fingerprint or palm scanners do not require the application of ink to a person's finger or palm. Instead, fingerprint or palm scanners may include a prism located in an optical path. One facet of the prism is used as the receiving surface or platen for receiving the biometric object. For example, with an optical fingerprint scanner, a finger is placed on the platen, and the scanner captures an image of the fingerprint. The fingerprint image is comprised of light and dark areas. These areas correspond to the valleys and ridges of the fingerprint.

Electro-optical devices utilize the optical principle of total internal reflection (TIR). The rays from a light source internal to these optical scanners reach the receiving surface of the device at an incidence angle that causes all of the light rays to be reflected back into the device. This occurs when the angle of incidence is equal to or greater than the critical angle, which is defined by the ratio of the two indices of refraction of the medium inside and above the surface of the device.

In the case of a fingerprint image capturing device, a finger (or fingers) is placed on the receiving surface of the device for obtaining a fingerprint image. Moisture and/or fluids on the finger operate to alter the refraction index at the receiving surface, thereby interrupting the TIR of the prism. This interruption in the TIR causes an optical image of the fingerprint to be propagated through the receiving surface and captured by a camera internal to the device.

Although the moisture and/or fluids on the finger enable the capture of the fingerprint image, excess moisture and/or fluids from the finger are undesirable and may also alter the refraction index at the receiving surface to thereby interrupt the TIR of the prism in undesirable places on the receiving surface.

For example, under certain conditions, the air in the microscopic vicinity of the fingerprint has a very high relative humidity and can only hold a certain amount of water vapor, depending on the air temperature. The temperature at which the air can no longer suspend the water in a gaseous form is known as the dew point. When the air temperature drops below the dew point, the moisture leaves the gaseous form and becomes water. If the water contacts the surface of the prism, it will break the TIR of the prism. This interruption in the TIR causes an optical image of the water on the biometric object receiving surface (e.g., a halo that is known in the relevant art as a halo effect) to be propagated through the biometric object receiving surface and captured by a camera internal to the device. As described above, this interruption in the TIR results in an undesirable visible image of the water in the image of the biometric object.

Therefore, what is needed is an apparatus and/or method for countering the effect of moisture, fluids and/or water deposited on the surface of the prism, as a result of high humidity air in the near vicinity of a biometric object to be imaged. Such an apparatus and/or method should prevent an undesirable interruption of the TIR of the prism in electro-optical biometric image capturing devices and result in prevention of a "halo effect."

BRIEF SUMMARY OF THE INVENTION

The present invention addresses the above-mentioned need by providing a heater assembly to heat a platen of a biometric image capturing device above room temperature. Two methods for applying heat to the platen according to the invention are described. The first method involves using an electrically conductive transparent material to apply heat to the platen. The second method involves using resistive heating elements attached to the non-optical areas of the platen (e.g., the ends) to apply heat to the platen.

Heating the platen reduces or eliminates moisture and/or fluids on a biometric object that change the relative humidity around the area of the platen where the biometric object is placed. The reduction or elimination of excess moisture surrounding the biometric object on the platen prevents a halo effect from appearing in the biometric image.

In embodiments of the invention, the heater assembly comprises an electrically transparent conductive film which dissipates power when an electrical current is emitted through the film. At least two electrical conductors are attached to the film. Each of the conductors serves as a contact point for a connector, which transfers electrical current from a power source to each of the conductors. A temperature sensor may also be attached on or near the conductive film.

In an embodiment, the heater assembly is used to directly heat the biometric receiving surface or platen. In this embodiment, the facet of the prism for receiving the biometric object is heated to prevent formation and/or remove excess moisture on the platen, thereby preventing the halo effect. In other embodiments, an adjacent face of the prism (i.e., a facet of the prism that does not receive the biometric object) is heated to prevent formation and/or remove excess moisture on the platen, thereby preventing the halo effect.

In embodiments of the invention, electrical heating elements are attached to the platen at locations where they do not affect the image illumination or fingerprint imaging. For example, in some embodiments, the electrical heating elements are located at the ends of the prism platen.

Further embodiments, features, and advantages of the present invention, as well as the structure and operation of the various embodiments of the present invention are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention.

FIG. 8 is a chart displaying the relationship between power states of the thermostat controller of FIG. 5 and heater assembly temperature according to an embodiment of the present invention.

Figure 1:
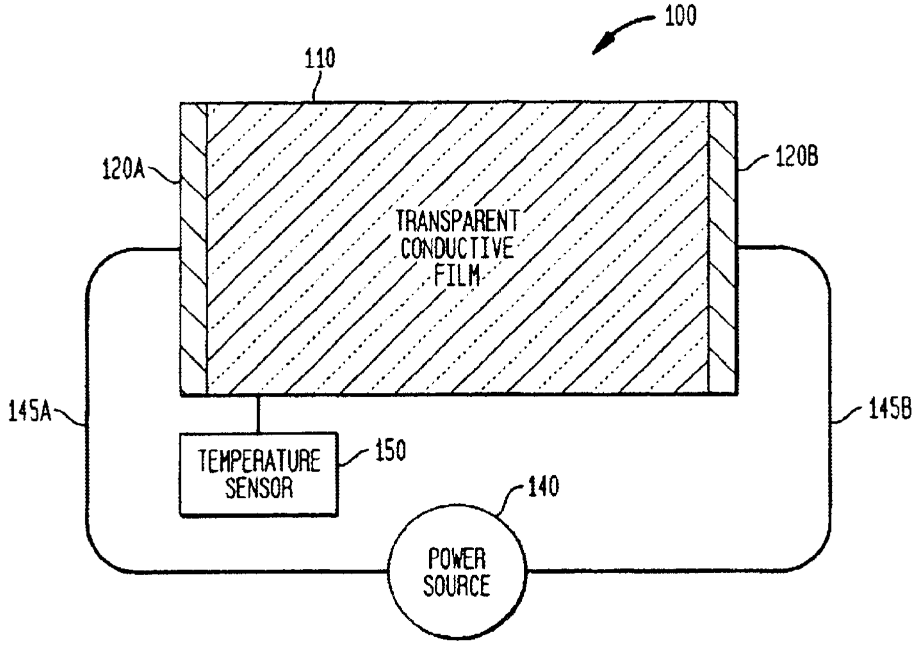
FIG. 1 is a diagram illustrating a transparent electrical heater assembly according to an embodiment of the present invention.

The features, objects, and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

Although the invention will be described in terms of specific embodiments, it will be readily apparent to those skilled in the pertinent art(s) that various modifications, rearrangements and substitutions can be made without departing from the spirit of the invention. Further, while specific examples will be discussed using a fingerprint scanner for the purpose of clarity, it should be noted that the present invention is not limited to fingerprint scanners. Other types of biometric scanners may be used without departing from the scope of the invention. For example, the present invention applies to fingerprint, palmprint, and other biometric scanners as well.

Referring now to FIG. 1, set forth is an illustration of one embodiment of a heater assembly of the present invention. The heater assembly may be attached to a top surface of a prism in an electro-optical fingerprint scanner. As discussed above, the heater assembly operates to counter the effect of the moisture surrounding the biometric object that results from excess moisture and/or fluids on an individual's finger that change the relative humidity around the area of the platen in which the finger is placed for imaging. Heater assembly 100 comprises a transparent conductive film 110, two electrically conductive bars 120A and 120B, connectors 145A and 145B, a power source 140, and a temperature sensor 150.

Electrically conductive bar 120A is attached to a first edge of transparent conductive film 110. Electrically conductive bar 120B is attached to a second edge of transparent conductive film 110. Electrically conductive bars 120A and 120B are placed in a manner that allows electrical current to be dispersed throughout the entire transparent conductive film 110. In other words, the objective is to provide uniform density throughout transparent conductive film 110. Alternatively, conductive bars 120A and 120B can also be placed on the top and bottom edges of the film to achieve uniform density in the film.

Connectors 145A and 145B connect electrically conductive bars 120A and 120B to power source 140. One end of connector 145A connects to electrically conductive bar 120A, and the opposite end of connector 145A connects to power source 140. Likewise, one end of connector 145B connects to electrically conductive bar 120B, and the opposite end of connector 145B connects to power source 140. Connectors 145A and 145B can be attached to the power source and electrically conductive bars 120A and 120B by any viable means known by those skilled in the art. For example, in one embodiment, the ends of connectors 145A and 145B can be soldered to conductive bars 120A and 120B and power source 140.

Temperature sensor 150 may be connected on or near transparent conductive film 110. In one embodiment, temperature sensor 150 is used in conjunction with a control system to maintain a desired temperature in conductive film 110. In such an embodiment, the temperature sensor 150 is coupled to a control system (not shown). The control system is coupled to power source 140. In yet another embodiment, temperature sensor 150 may reside within power source 140.

Transparent conductive film 110 generates heat to the biometric object receiving surface, such as a platen. Transparent conductive film 110 can be made of plastic, or any electrically conductive material known in the art. For example, in one embodiment, transparent conductive film 110 is comprised of a clear polyester substrate. In one embodiment, transparent conductive film 110 is eighty percent transparent and is capable of operating at twenty ohms per square. Transparent conductive film 110 can be any viable shape. For example, transparent conductive film 110 can be rectangular or circular. In the embodiment in which transparent conductive film 110 is circular, conductive bars 120A and 120B are contoured to fit the outer edge of transparent conductive film 110.

Electrically conductive bars 120A and 120B serve as contact points for connectors 145A and 145B. Electrically conductive bars 120A and 120B can be made of metal, copper, silver, or any other conductive material. Furthermore, it should be noted that electrically conductive bars 120A and 120B can be shaped into any pattern useful for attaching them to transparent conductive film 110.

Connectors 145A and 145B transfer energy from power source 140 to transparent conductive film 110 via conductive bars 120A and 120B. Connectors 145A and 145B can be electrical wires or any other channel for transporting energy.

Electrical power dissipated in transparent conductive film 110 from power source 140 causes the temperature of transparent conductive film 110 to rise above room temperature, thus eliminating the excess moisture on the platen that surrounds the fingertip and preventing the halo effect from appearing in an image of the fingerprint. Power source 140 can provide alternating or direct current.

Temperature sensor 150 monitors the temperature of transparent conductive film 110. When the heat dissipated in transparent conductive film 110 causes transparent conductive film 110 to obtain a temperature high enough to prevent formation or to evaporate excess moisture on the platen, the above-referenced control system, having been signaled by temperature sensor 150, automatically causes power source 140 to adjust its generation of power. Upon sensing that the temperature in transparent conductive film 110 has gone below a specified level, temperature sensor 150 will notify the control system to cause power source 140 to generate enough power to cause the temperature to increase.

Figure 2:
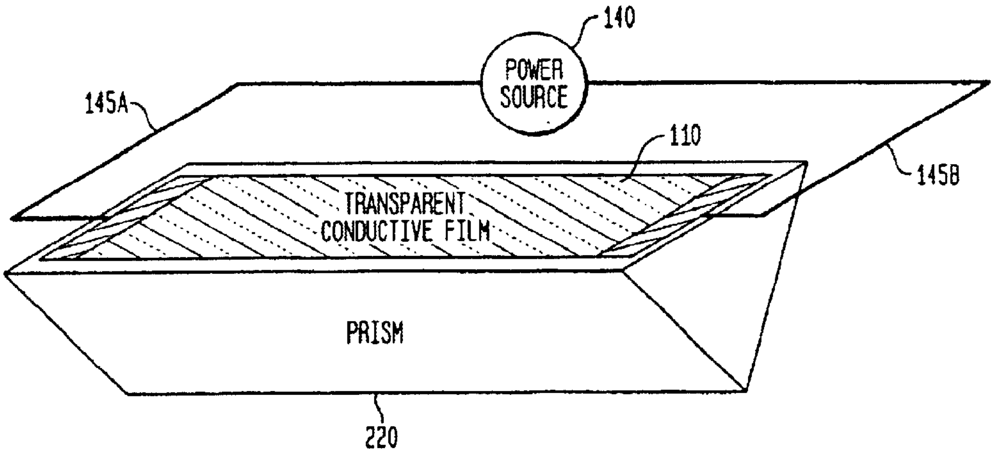
FIG. 2 is a diagram illustrating a transparent electrical heater assembly atop a prism according to an embodiment of the present invention.

FIG. 2 depicts transparent heater assembly 100 attached to a face of a prism 220. Heater assembly 100 can be attached to the face of prism 220 by any viable means known to one skilled in the pertinent art. Heater assembly 100 heats the face of prism 220 to prevent the formation and/or to remove excess moisture on the platen that surrounds the biometric object being imaged. This eliminates the halo effect that may occur in a captured image of the biometric object.

Prism 220 is an optical device made of a light propagating material such as plastic, glass, or a combination thereof. The light propagating material is characterized by an index of refraction. Prism 220 is designed to utilize the optical principle of total internal reflection. The operation of a prism in a fingerprint scanner is further described in U.S. Pat. No. 5,467,403, to Fishbine et al., entitled “Portable Fingerprint Scanning Apparatus for Identification Verification” issued on Nov. 14, 1995 to Digital Biometrics, Inc. and incorporated herein by reference in its entirety.

In the embodiment depicted in FIG. 2, heater assembly 100 rests directly on the top surface of the prism 220. Transparent conductive film 110 is the only exposed element of heater assembly 100. Transparent conductive film 110 serves as the platen, and the biometric object rests directly on transparent conductive film 110 of heater assembly 100. Heated transparent conductive film 110 operates to counter the effect of nearby excessive moisture from the biometric object resting on its surface, thereby eliminating the halo effect. Furthermore, transparent conductive film 110 may be made disposable and eventually be discarded and replaced with a new transparent conductive film as mechanical wear becomes evident.

In another embodiment, heater assembly 100 is directly attached to the top surface of prism 220. The biometric object receiving surface (for example, a glass or plastic platen) is placed atop heater assembly 100. The fingerprint being imaged is then placed on the platen for imaging. Heater assembly 100 heats the platen. When a finger is placed on the platen for image capture, the excess moisture is prevented from forming on the platen or is removed by the heat, thereby eliminating the halo effect that may appear in the captured image area.

Figure 3:
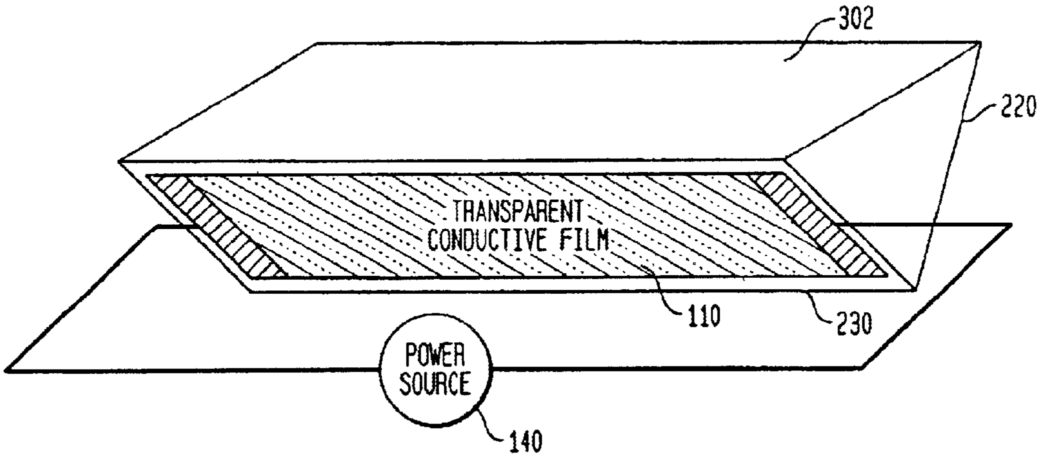
FIG. 3 is a diagram illustrating a transparent electrical heater assembly attached to an adjacent face of a prism according to an embodiment of the present invention.

FIG. 3 depicts heater assembly 100 attached to an adjacent face 230 of prism 220. A biometric object rests on biometric object receiving surface 302 (e.g., the top of prism 220). In this embodiment, attachment of heater assembly 100 to adjacent face 230 of prism 220 protects transparent conductive film 110 from the eventual tattering associated with its placement on the top surface of prism 220. In other words, if transparent conductive film 110 is placed on adjacent face 230 of prism 220, the finger does not come into direct contact with transparent conductive film 110. As a result, the life of transparent conductive film 110 is increased. In the embodiment depicted in FIG. 3, biometric object receiving surface 302 is the top surface of prism 220. In other embodiments, biometric object receiving surface 302 is a silicone rubber sheet with optical quality, as described in U.S. Provisional Pat. Appl. Ser. No. 60/286,373, entitled “Silicone Rubber Surfaces for Biometric Print TIR Prisms”, filed Apr. 26,2001, to Arnold et al., which is incorporated herein by reference in its entirety. Biometric object receiving surface 302 allows the finger being imaged to rest on its surface.

Instead of heating the top surface of prism 220, heater assembly 100 heats adjacent face 230 of prism 220. Heater assembly 100 heats adjacent face 230 of prism 220 to increase the temperature on the top surface of prism 220. The heat from the top surface of prism 220 causes the temperature of biometric object receiving surface 302 to rise. When a specified temperature is achieved, the excess moisture is prevented from forming on the biometric object receiving surface 302 or is evaporated, thereby eliminating the halo effect that may appear in the captured image of the finger.

Figure 4:
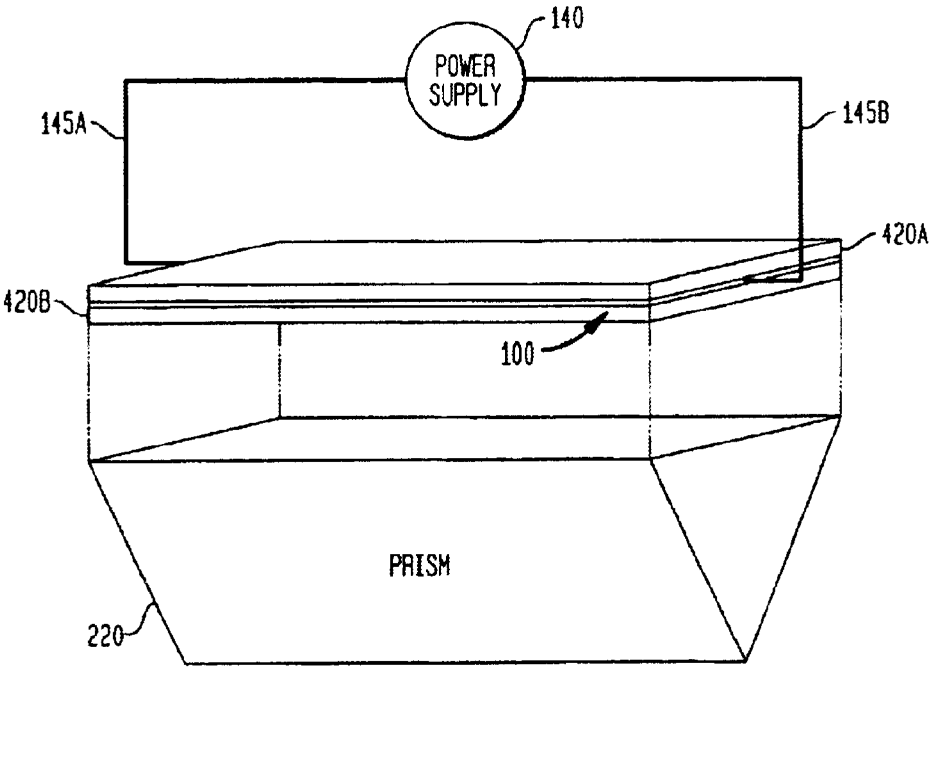
FIG. 4 is a diagram illustrating a transparent heater assembly lodged between a removable finger receiving surface atop a prism according to an embodiment of the present invention.

FIG. 4 depicts heater assembly 100 inserted between two silicone pads 420A and 420B. Silicone pad 420B is attached to a top face of prism 220. Heater assembly 100 rests atop silicone pad 420B. Silicone pad 420A rests atop heater assembly 100. The biometric object (e.g., finger) to be imaged is placed on top of silicone pad 420A. In other words, silicone pad 420A serves as the platen. Heater assembly 100 heats silicone pad 420A to a specified temperature that prevents formation of excess moisture that results from a finger placed on silicone pad 420A, as described above.

Figure 5:
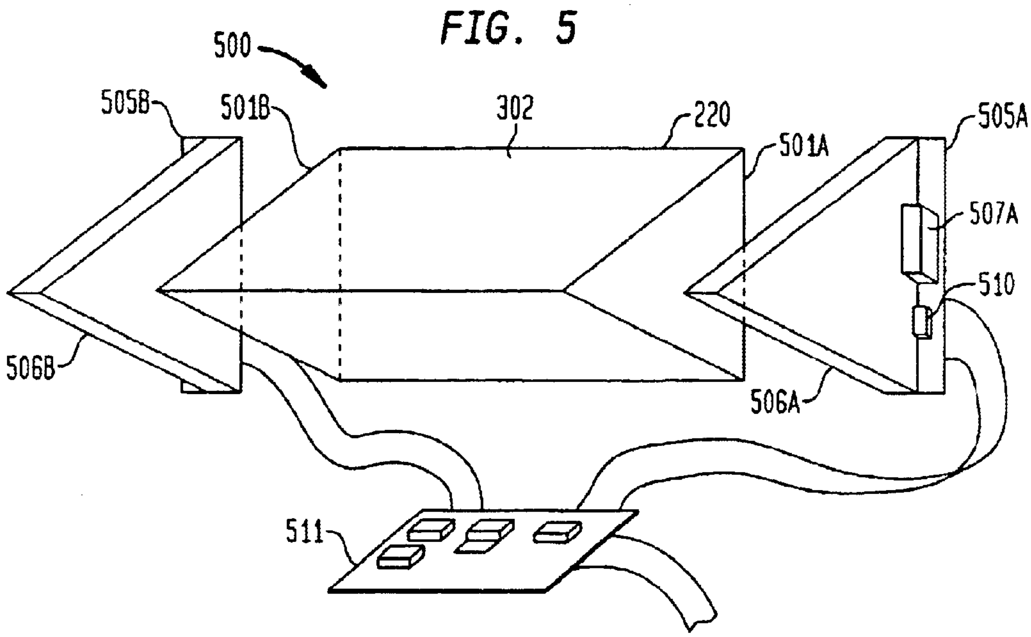
FIG. 5 is a diagram illustrating a non-transparent heating device according to an embodiment of the present invention.

Referring now to FIG. 5, set forth is an illustration of one embodiment of a heating device 500 of the present invention. Heating device 500 can provide heat or thermal energy to prism 220 and biometric object receiving surface 302. In one embodiment, heating device 500 includes heater assemblies 505A, 505B, thermostat controller 510, and power distribution and transistor board 511. Heater assembly 505A includes conductor 506A and resistive heating element 507A. Similarly, heater assembly 505B includes conductor 506B and resistive heating element 507A (not shown in FIG. 5).

Thermostat controller 510 is coupled to resistive heating element 507A and power distribution and transistor board 511. Power distribution and transistor board 511 is also coupled to each of the resistive heating elements 507A and 507B, as shown in FIG. 5 and to a power supply (not shown).

Resistive heating elements 507A and 507B generate an amount of heat that depends upon the amount of power provided by power distribution and transistor board 511. Resistive heating elements 507A and 507B are thermally coupled to conductors 506A and 506B, respectively, so that the heat from the resistive heating elements 507A and 507B is conducted through conductors 506A and 506B to prism 220 and biometric object receiving surface 302.

Each of the heater assemblies 505A and 505B can be directly coupled or placed in thermal contact with a respective end 501A and 501B of prism 220 in a print scanner. For example, conductor 506A of heater assembly 505A can be coupled flush against a first end 501A of the prism 220. Likewise, the heater assembly 505B can be coupled flush against a second end 501B of the prism 220. In one embodiment of the present invention, each of the conductors 506A and 506B is comprised of a heat conductive element such as copper, aluminum, or nickel, etc. A print scanner can be any type of optical print scanner such as a fingerprint scanner and/or palm print scanner.

As discussed above, the heater assemblies 505A and 505B operate to raise surface temperature near the biometric object receiving surface 302. This prevents water condensation from forming on the biometric object receiving surface 302. As a result, the above-referenced halo effect is prevented.

Figure 6:
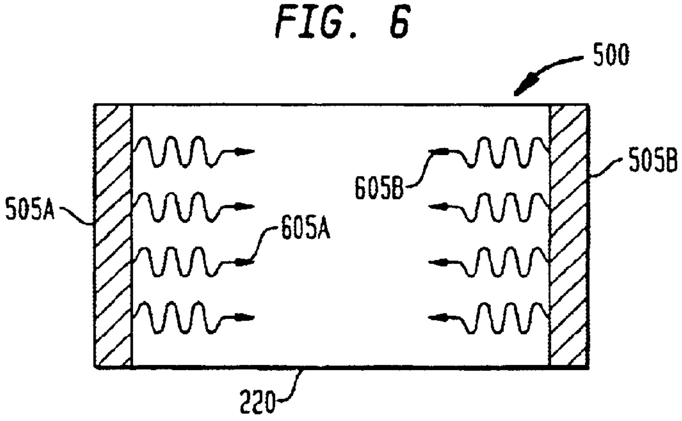
FIG. 6 is a diagram illustrating heat dispersion of the heating device of FIG. 5 according to an embodiment of the present invention.

FIG. 6 is a diagram illustrating heat dispersion in a prism according to an embodiment of the present invention. FIG. 6 depicts heater assemblies 505A, 505B and prism 220. The heater assembly 505A generates a first set of energy waves 605A. Likewise, the heater assembly 505B generates a second set of energy waves 605B. The energy waves 605A and 605B are dispersed throughout the prism 220, thereby increasing the temperature in prism 220 and biometric object receiving surface 302. In this way, the biometric object receiving surface 302 is heated to a temperature sufficient for preventing the formation of excess moisture on the platen near the biometric object. This improves the quality of images detected by the print scanner and results in prevention of the above-described halo effect.

According to a further feature of the present invention, thermostat controller 510 regulates heating according to three states which include full power, half power, and no power (off). Thermostat controller 510 acts as a transducer and senses the temperature of heater assembly 505A. Thermostat controller 510 controls the amount of power provided by power distribution and transistor board 511 to each of the resistive heating elements 507A and 507B. Operation of the thermostat controller 510 is described below with respect to an example implementation (see FIGS. 7 and 8).

Figure 7:
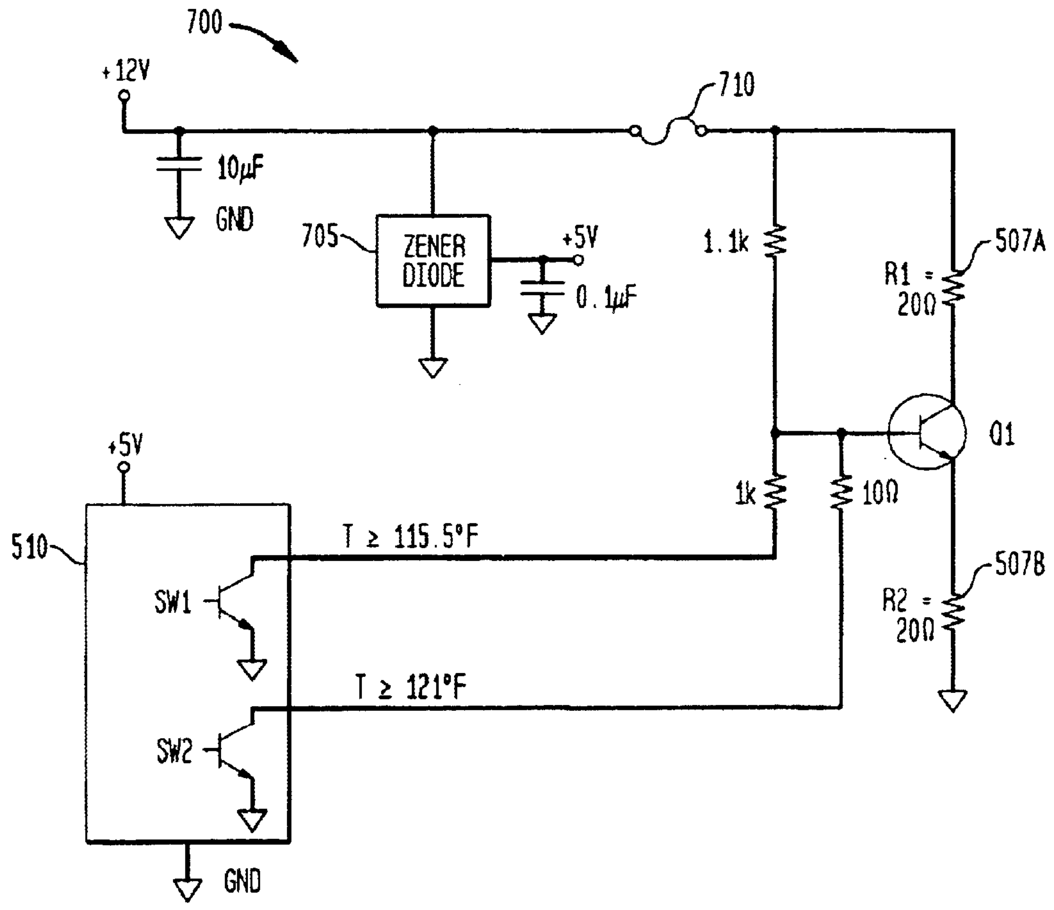
FIG. 7 is an exemplary circuit diagram of the heating device of FIG. 5 according to an embodiment of the present invention.

FIG. 7 shows an example electrical circuit 700 that can be provided on power distribution and transistor board 511 to couple thermostat controller 510 and resistive heating elements 507A and 507B.

As shown in FIG. 7, electrical circuit 700 includes a bias voltage (+12V), in-circuit protection fuse 710, and transistor Q1. Transistor Q1 is coupled in series between resistive heating elements 507A and 507B. The bias provided to transistor Q1 is controlled by two switches and thermostat controller 510. These two switches labeled SW1 and SW2 are each coupled to the base of transistor Q1. Zener diode 705 acts to maintain a constant bias voltage source for thermostat controller 510. In-circuit protection fuse 710 is added to provide protection against excessive currents being drawn by resistive heating elements 507A and 507B in an overheating condition or circuit failure.

FIG. 8 displays relationships between states and other various elements of the heating device 500. Referring now to FIG. 8, thermostat controller 510 senses the temperature of heater assembly 505A. Switches SW1 and SW2 are switched on and off depending upon whether the sensed temperature has reached respective first and second thresholds. Switch SW1 has a first threshold that corresponds to a temperature greater than or equal to 115.5° F. Switch SW2 is switched on or off depending upon a second threshold temperature greater than or equal to 121° F. As shown in FIG. 8, in an initial state where the temperature of heater assembly 505A is less than 115.5° F., both switches SW1 and SW2 are in an off state. In this condition, the transistor Q1 is fully saturated and full power is provided across resistive heating elements 507A and 507B. In one example, the resistance of resistive heating element 507A has a resistance value R1 equal to approximately 20 Ohms. Similarly, the resistance value of a second resistive heating element 507B is denoted by a value R2 equal to approximately 20 Ohms. Because the resistive heating elements 507A and 507B are arranged in series, each resistive heating element emits the same heating power. In the full power state, the combined power of the heating elements is about 3.7 Watts according to one example of the present invention.

When the temperature of heater assembly 505A rises to the first threshold equal to or greater than 115.5° F., then thermostat controller switch SW1 is turned on while SW2 remains off. This changes the bias provided to transistor Q1 and cuts the overall power across resistive heating elements 507A and 507B in half. When the temperature of heater assembly 505A rises to a second threshold greater than or equal to 121° F., then both of the switches SW1 and SW2 are turned on. In this condition, the transistor Q1 is turned off and zero power is provided across resistive heating element 507A and 507B.

The present invention is not limited to two thresholds. Additional thresholds can be used if more fine control of heating as a function of heater assembly 505A temperature is desired. In another embodiment, thermostat controller 510 can be omitted entirely so that a constant heating power is provided, regardless of temperature changes. In addition, thermostat controller 510 can be operated using only one switch and one threshold if a more simple control of heating power is desired. Finally, the threshold values 115.5° F. and 121° F. are illustrative values used in one preferred embodiment of the present invention. Other temperature values can be used as will become apparent to a person skilled in the relevant art given the description of the present invention.

Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. A system for capturing attributes of a biometric object, comprising:

an electro-optical biometric image capturing system having an optical path through a prism to a platen from which an image of a ridged print pattern can be captured through total internal reflection at the platen; and a heater assembly coupled to said electro-optical biometric image capturing system for enhancing performance of said electro-optical biometric image capturing system;

wherein said heater assembly is attached to a surface of said prism, wherein said surface is outside the optical path, such that the heater assembly heats a biometric object receiving surface of said electro-optical biometric image capturing system to eliminate additional moisture near a biometric object on said biometric object receiving surface without interfering in the optical path.

2. A heating apparatus for heating a prism of an electro-optical image capturing device having a light path through the prism to a platen from which an image of a ridged print pattern can be captured through total internal reflection at the platen, thereby preventing a halo effect in an image of a biometric object resting on the platen, comprising:

a first heater assembly coupled to a first end of the prism wherein the first end of the prism is located outside the light path; and a second heater assembly coupled to a second end of the prism wherein the second end of the prism is located outside the light path;

wherein said first heater assembly and said second heater assembly each include a heating element for generating heat in the prism, thereby causing temperature in the prism to rise such that a halo effect is prevented from forming on the image of the biometric object.

3. The heating apparatus of claim 2, further comprising a thermostat controller which controls the amount of heat provided by said first heater assembly and said second heater assembly.

4. The heating apparatus of claim 3, wherein said thermostat controller controls the amount of heat provided by each heater assembly as a function of heater assembly temperature.

5. The heating apparatus of claim 3, wherein the thermostat controller controls the amount of heat provided such that each heater assembly operates in one of three states including:

a full power state;

a half power state; and a no power state.

6. The heating apparatus of claim 2, wherein the platen is a surface of the prism.

7. The heating apparatus of claim 2, wherein the platen comprises a silicone pad optically coupled to a surface of the prism.

8. The heating apparatus of claim 2, wherein said heating element is a resistive heating element.

* * * * *